(12) United States Patent
Ohno et al.

(10) Patent No.: US 12,097,155 B2
(45) Date of Patent: Sep. 24, 2024

(54) MATTRESS, SENSOR SYSTEM

(71) Applicant: PARAMOUNT BED CO., LTD., Tokyo (JP)

(72) Inventors: Kenta Ohno, Tokyo (JP); Makoto Tanaka, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 393 days.

(21) Appl. No.: 17/330,593

(22) Filed: May 26, 2021

(65) Prior Publication Data
US 2021/0378415 A1 Dec. 9, 2021

(30) Foreign Application Priority Data

Jun. 9, 2020 (JP) .................. 2020-100193

(51) Int. Cl.
*A61G 7/057* (2006.01)
*A47C 27/08* (2006.01)
*G01D 5/24* (2006.01)

(52) U.S. Cl.
CPC .......... *A61G 7/05776* (2013.01); *A47C 27/08* (2013.01); *A61G 2203/30* (2013.01); *G01D 5/24* (2013.01)

(58) Field of Classification Search
CPC ........ G01R 27/00; G01R 27/02; G01R 27/26; G01R 27/2605; G01D 5/00; G01D 5/12; G01D 5/14; G01D 5/24; G01D 5/241; G01D 5/2417; A61G 7/00; A61G 7/05; A61G 7/057; A61G 7/05769; A61G 7/05776; A61G 2203/00; A61G 2203/30; A61G 2203/32; A61G 2203/34; A61G 2203/40; A47C 21/00; A47C 27/00; A47C 27/08; A47C 27/10; A47C 27/12; A47C 27/122; A47C 27/14; A47C 27/18
See application file for complete search history.

(56) References Cited

U.S. PATENT DOCUMENTS

| | | | |
|---|---|---|---|
| 7,685,658 B2 | 3/2010 | Lokhorst et al. | |
| 10,131,993 B2 * | 11/2018 | Varadan | C23C 18/1692 |
| 10,401,241 B2 * | 9/2019 | Madden | G06F 3/04144 |
| 10,806,273 B2 | 10/2020 | Nakamura et al. | |
| 11,247,233 B2 * | 2/2022 | Nakano | B06B 1/0292 |
| 11,440,191 B2 * | 9/2022 | Bordegnoni | B25J 13/086 |
| 11,561,114 B2 * | 1/2023 | Kobayashi | H03K 17/962 |
| 2008/0005843 A1 | 1/2008 | Lokhorst et al. | |
| 2009/0260158 A1 | 10/2009 | Kazuno | |
| 2017/0251823 A1 | 9/2017 | Nakamura et al. | |
| 2022/0257174 A1 * | 8/2022 | Yildirim | A61B 5/6891 |

FOREIGN PATENT DOCUMENTS

| | | | | |
|---|---|---|---|---|
| CN | 109984749 A | | 7/2019 | |
| EP | 3917176 B1 | * | 10/2023 | ......... G01S 5/02524 |
| JP | 2004-159809 A | | 6/2004 | |

(Continued)

*Primary Examiner* — Hoai-An D. Nguyen
(74) *Attorney, Agent, or Firm* — Renner, Otto, Boisselle & Sklar, LLP

(57) ABSTRACT

A mattress including: an elastic body; a sheet that is disposed at least above the elastic body and made of any of a conductive sheet and a conductive fiber; and a measurement unit that is configured to measure a change of capacitance of the sheet observed when the elastic body is deformed.

20 Claims, 11 Drawing Sheets

(56) References Cited

FOREIGN PATENT DOCUMENTS

| | | | | |
|---|---|---|---|---|
| JP | 2007-190269 A | | 8/2007 | |
| JP | 2007229077 A | * | 9/2007 | ............... A61B 5/00 |
| JP | 2008-505663 A | | 2/2008 | |
| JP | 2008252852 A | | 3/2008 | |
| JP | 2012050521 A | * | 3/2012 | ............. A47C 27/10 |
| JP | 2014064692 A | | 4/2014 | |
| JP | 2017-169881 A | | 9/2017 | |
| JP | 2017153743 A | | 9/2017 | |
| JP | 2018165135 A | * | 10/2018 | ........... A61B 5/0022 |
| JP | 2019-103888 A | | 6/2019 | |
| KR | 20190060257 A | * | 6/2019 | ........... A61B 5/7275 |
| TW | 201542187 A | * | 11/2015 | ............... A61G 7/05 |

* cited by examiner

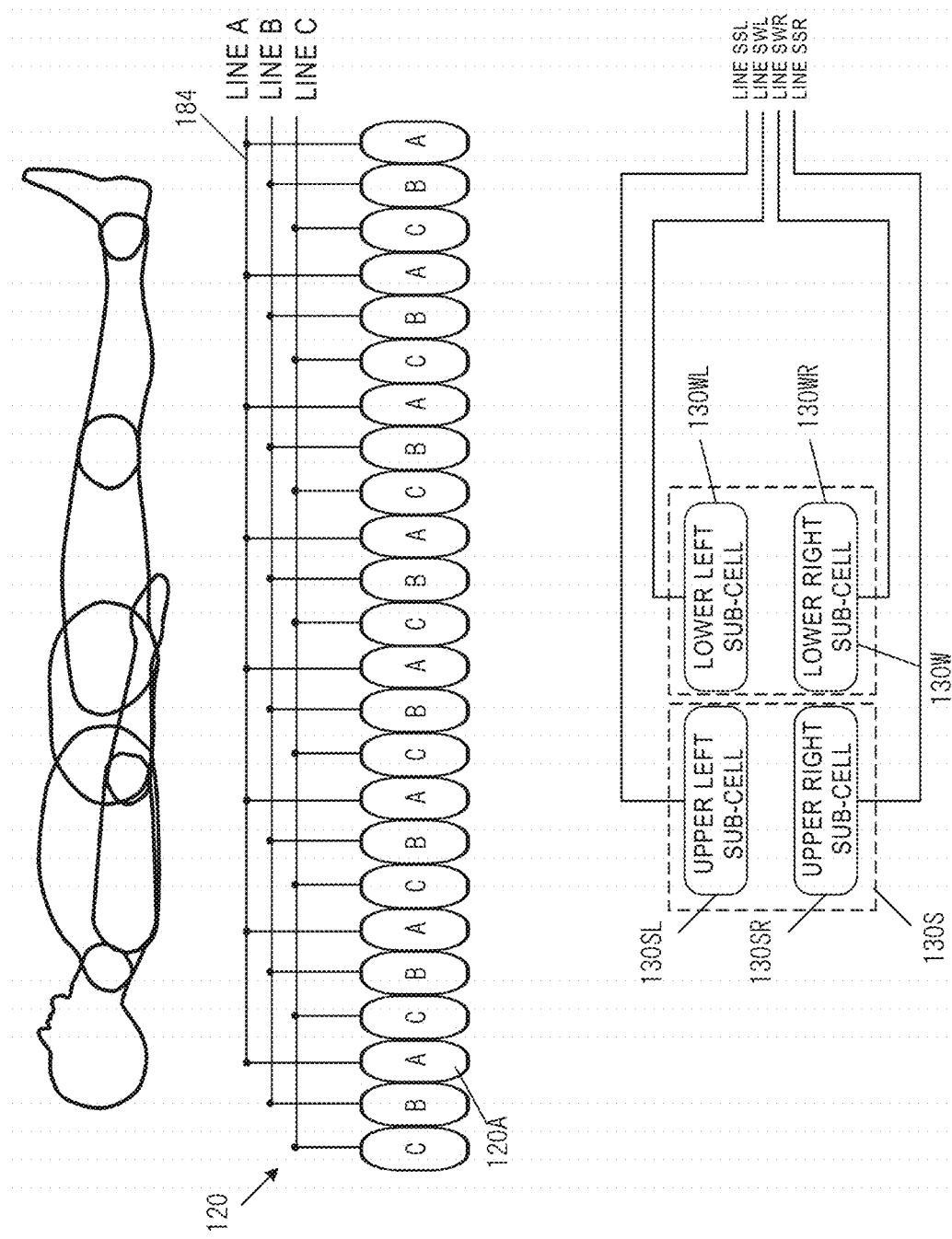

FIG. 8A
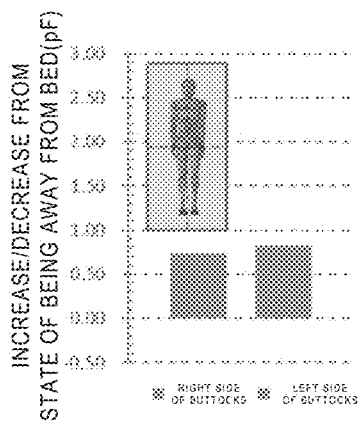
FIG. 8B
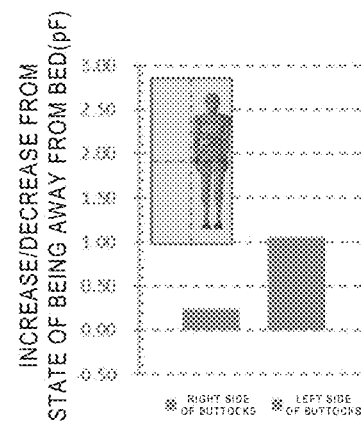
FIG. 8C
| WEIGHT: 30 KG | | WEIGHT: 59 KG | | WEIGHT: 78 KG | |
|---|---|---|---|---|---|
| TIME (s) | INNER PRESSURE (kPa) | TIME (s) | INNER PRESSURE (kPa) | TIME (s) | INNER PRESSURE (kPa) |
| 00:00:00 | 2 | 00:00:00 | 2 | 00:00:00 | 2 |
| 00:00:02 | 1.49 | 00:00:03 | 1.5 | 00:00:04 | 1.5 |
| 00:00:13 | 0.98 | 00:00:16 | 1 | 00:00:19 | 1 |
| 00:00:32 | 0.5 | 00:00:40 | 0.5 | 00:00:49 | 0.5 |
| 00:00:47 | 0.3 | 00:00:57 | 0.3 | 00:01:11 | 0.3 |
| 00:01:29 | 0.1 | 00:01:32 | 0.1 | 00:02:03 | 0.1 |
| 00:02:00 | 0.05 | 00:01:54 | 0.05 | 00:02:36 | 0.05 |
| 00:02:53 | 0 | 00:02:34 | 0 | 00:03:38 | 0 |

FIG. 9A

|  | | SLEEPING POSITION (pF) | | |
|---|---|---|---|---|
|  | | CENTER | 150 mm AWAY FROM CENTER | 250 mm AWAY FROM CENTER |
| WEIGHT | 19 | 0.22 | 0.17 | 0.1 |
|  | 42 | 0.37 | 0.17 | 0.08 |
|  | 64 | 0.83 | 0.42 | 0.22 |

FIG. 9B

|  | WEIGHT (kg) (pF) | | |
|---|---|---|---|
|  | 20kg | 40kg | 60kg |
| INITIAL VALUE (kPa) | 2.6 | 2.6 | 2.5 |
| INNER PRESSURE (kPa) | 2.8 | 3.1 | 3.5 |
| AMOUNT OF INCREASE | 0.2 | 0.5 | 1 |

MATTRESS, SENSOR SYSTEM

FIELD

This disclosure relates to a mattress and the like.

BACKGROUND

Heretofore, a method for detecting a position where a user is sleeping on a mattress (sleeping position) has been known. For example, techniques for detecting a sleeping position of a user have been known such as one using a sensor and one using a load sensor that is provided on abed apparatus (JP-A-2004-159809 and JP-A-2007-190269, for example).

BRIEF DESCRIPTION OF THE DRAWINGS

FIG. 6 is a diagram illustrating the configuration of sub-air cells in the embodiment of this disclosure.

FIG. 8A is a chart illustrating the operation in the embodiment of this disclosure.

FIG. 8B is a chart illustrating another operation in the embodiment of this disclosure.

FIG. 8C is a chart illustrating results of an operation in the embodiment of this disclosure.

FIG. 9A is a chart illustrating results of an operation in the embodiment of this disclosure.

FIG. 9B is a chart illustrating results of an operation in the embodiment of this disclosure.

DETAILED DESCRIPTION

Figure 1A:
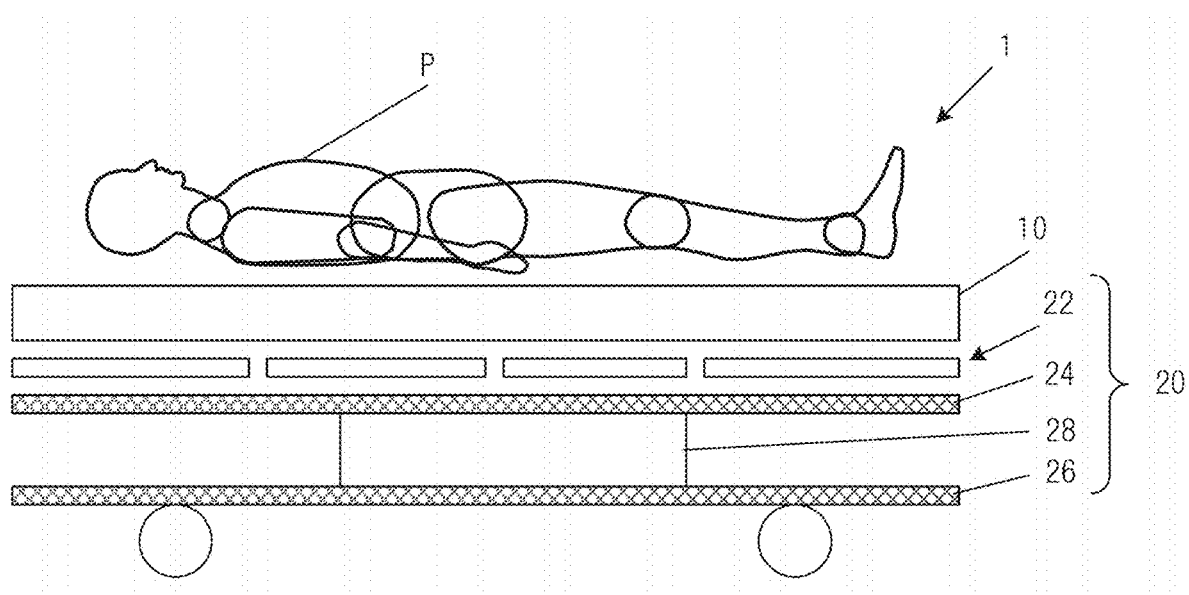
FIG. 1A is a schematic diagram illustrating a system in an embodiment of this disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, or a combination of hardware and software in execution.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software stored on a non-transitory electronic memory or firmware that confers at least in part the functionality of the electronic components. While various components have been illustrated as separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer-readable (or machine-readable) device or computer-readable (or machine-readable) storage/communications media having a computer program stored thereon. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

A mattress of this embodiment is characterized by including: one or more conductive sheets that are made of a conductive sheet or a conductive fiber; an elastic body that is adjacent to the conductive sheet; and a measurement unit that is configured to measure a change of capacitance of the conductive sheet observed when the elastic body is deformed.

A sensor system of this embodiment is characterized by including: one or more conductive sheets that are made of a conductive sheet or a conductive fiber; an elastic body that is adjacent to the conductive sheet; a measurement unit that is configured to measure a change of capacitance of the conductive sheet observed when the elastic body is deformed; and a judgment unit that is configured to judge a position of an object on the elastic body from the change of the capacitance measured by the measurement unit.

Hereinbelow, an embodiment for carrying out this disclosure is described with reference to the drawings. Note that, the following embodiment is an example for explaining this disclosure, and the technical scope of this disclosure described in the scope of claims is not limited to the following description.

Heretofore, a system including a bed apparatus and a mattress implements detection on whether or not a user is on the mattress and detection on a position where the user is sleeping on the mattress (sleeping position). There are some methods as a method for the system to detect the sleeping position of the user.

The first method is to detect variation of air pressure as vibration, and detect the sleeping position of the user on the mattress using this vibration. However, in the first method, if the mattress is thick, the vibration of the user is not easily transmitted and thus the sleeping position of the user cannot be detected properly. In addition, in the first method, the transmissibility of vibration depends on the shape of a section of a bed. Accordingly, this method has a problem in that, if the mattress is lifted up by back raising for example, vibration becomes less easily transmitted and therefore the sleeping position of the user becomes unable to be detected properly.

The second method is to provide a load sensor such as a load cell in a leg portion of the bed apparatus, and detect the sleeping position of the user using the load sensor. However, in the second method, the sleeping position cannot be detected by the mattress by itself. In addition, the second method has problems in that the cost is high, and that the sensor is strained such as when drift occurs by keeping the sensor constantly loaded.

The third method is to embed a sheet-shaped body pressure distribution sensor into the mattress, and detect the sleeping position of the user using this body pressure distribution sensor. However, the third method has a problem in that the sheet-shaped body pressure distribution sensor needs to be embedded into the mattress and this increases the cost. The third method also has a problem in that the provided sensor is strained such as when drift occurs by keeping the sensor constantly loaded.

The fourth method is to detect the sleeping position of the user using an overcurrent proximity sensor or air pressure sensor. However, the proximity sensor in the fourth method has a short detection distance (around 30 mm) and narrow detection range (around 30 mm). In addition, the proximity sensor in the fourth method has a problem in that it is affected by a metallic section of the bed apparatus and therefore cannot detect the sleeping position of the user properly. Likewise, the air pressure sensor in the fourth method also has a problem in that it has a narrow detection range and a large margin of error, and therefore this increases the size of the apparatus.

Meanwhile, the fifth method is to provide a sensor to a frame of the bed apparatus and detect the sleeping position of the user using this sensor. For example, conceivable examples of the sensor include a weight sensor, a resistance type pressure sensor, an electrostatic capacitance type sensor, and a piezoelectric sensor. In addition, a load meter may also be used in the bed apparatus. However, in this case, since two or more kinds of sensors are needed besides the bed apparatus, there is a problem that the sleeping position of the user cannot be judged by the mattress by itself.

Further, when an overcurrent proximity sensor is used as the sensor in the fifth method, a shielding induction coil is typically provided in order to reduce the influence of a section of the bed apparatus. This induces problems of an increase in the size of the apparatus and an increase in cost.

In order to solve these problems, a mattress and the like are described below based on a detailed embodiment. Note that, the following embodiment is an example of this disclosure, and this disclosure is not limited to the contents of this embodiment.

1. Overall Configuration

FIG. 1A is a diagram schematically illustrating a bed system 1 in this embodiment. As illustrated in FIG. 1A, in the bed system 1, a mattress 10 is placed on a bed body 20 which is a bed apparatus.

Note that, in this embodiment, the mattress 10 is an air mattress formed of air cells. Instead of the air mattress, the mattress 10 may be a urethane mattress or a hybrid type mattress obtained by combining urethane and air cells, for example. Alternatively, the mattress 10 may be an elastic body used for bedclothing such as a polyester fiber structure, gel, and spring.

The bed system 1 is used by a user P. For example, when the user P lies on the bed body 20 (the mattress 10), the head side is on the left side of FIG. 1A, whereas the foot side is on the right side thereof. In addition, under the assumption that the user P is of a normal size, the back of the user P is located at the position of a back section, and the waist of the user is located at the position of a curved section or a seat section. Specifically, in the case of a normal user, the greater trochanter is located approximately 980 mm from a foot side end part of the mattress 10 (the bed body 20).

Here, the user indicates, among persons using the bed system, a person actually using the bed apparatus (mattress), for example. The user indicates a patient or a person who needs to be cared for in a hospital or facility, or a person who is lying on the bed apparatus (mattress) in a house, for example.

In addition, in this embodiment, a staff indicates a person who supports the user. For example, the staff includes a medical staff such as a doctor and a nurse in a hospital, a nursing care staff in a facility, a family member of the user in a house, and the like.

Further, in this embodiment, an operator indicates a person who manipulates the bed system. The operator is mainly the staff, but also includes the user when the user manipulates the bed system.

Under the assumption of a normal-sized user (with a height of around 140 to 170 cm), the typical bed body 20 has dimensions of 910 mm the width direction which is the lateral direction and 1910 mm in the length direction which is the longitudinal direction. This size of the bed body is an example for explaining the embodiment, and the bed body may be a more compact mini size body (1800 mm the length direction of the bed body) or may be a larger long size (e.g., 2050 mm in the length direction of the bed body), for example. In addition, if the size of the bed body 20 changes, the position of the user relative to the bed body also changes.

The locations (positions) of portions of the user change according to the size of the bed body 20 or the mattress 10. The position of the user observed when the size of the bed body 20 (the mattress 10) changes can be easily understood by those skilled in the art based on the contents of this disclosure.

In addition, the body position of the user in this embodiment includes the position of the user and the posture of the user. The position of the user indicates the position of the user on the mattress 10 (sleeping position). The posture of the user indicates the posture of the user observed when the user is sleeping on the mattress 10 (sleeping posture). Further, the body position may include the posture of the user observed when the user is not sleeping, such as a sitting position with his/her soles of feet on the floor and a long sitting position.

2. Configuration of Bed Body

The configuration of the bed body 20 is described with reference to FIGS. 1A-2.

The bed body 20 includes a section 22, an upper frame 24, and a lower frame 26 as viewed from an upper side, and has an elevating mechanism 28 between the upper frame 24 and the lower frame 26.

Figure 1B:
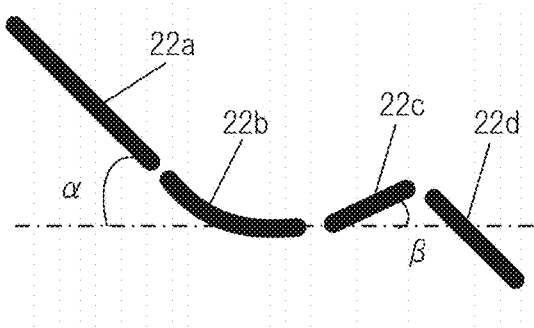
FIG. 1B is a diagram illustrating the configuration of a section of a bed apparatus in an embodiment of this disclosure.

As illustrated in FIG. 1B, the section 22 has, as viewed from the head side to the foot side when the user lies on the bed body 20, a back section 22a, a curved section 22b as the seat section, an upper leg section 22c, and a lower leg section 22d. Here, these sections of the section 22 are capable of turning by itself or in conjunction with each other.

Note that, the curved section 22b can support the user by curving along with an elevation of the back section 22a. Alternatively, the curved section 22b may have such a structure that it extends or contracts while curving along with an elevation/lowering of the back section 22a. Here, the curved section has already been put on the market by the applicant as Kyma Line Bottom (Kyma Bottom).

In addition, for example, the back section 22a has a length (a length horizontal to the longitudinal direction of the bed body 20) of approximately 640 mm, the curved section 22b has a length of approximately 340 mm, the upper leg section 22c has a length of approximately 375 mm, and the lower leg section 22d has a length of approximately 555 mm.

Each section is connected to a driving device (actuator), for example. The section 22 is turnable by the operation of the driving device. Note that, by using a link mechanism for example, a single driving device can operate multiple sections of the section 22 without connecting driving devices to the respective sections. In addition, by joining the adjacent sections to each other, the sections of the section 22 operate in conjunction with each other.

Meanwhile, by turning the sections, the bed body 20 implements operations such as a back raising operation, an upper leg raising operation, and a lower leg lowering operation. The bed body 20 may further cause the back raising operation and the upper leg raising operation (lower leg lowering operation) to be performed in conjunction with each other.

As illustrated in FIG. 1B, the bed body 20 implements the back raising operation in such a way that the back section 22a is turned and elevated around its curved section 22b side. An angle $\alpha$ by which the back section 22a is raised (an angle $\alpha$ by which the back section 22a is elevated above a horizontal plane) at this time is referred to as a back raising angle $\alpha$.

In addition, when the back section 22a is elevated, the curved section 22b curves in conjunction with the back section 22a. The curved section 22b can support the user by curving and conforming to the waist of the user. The back section 22a and the curved section 22b are joined to each other via their respective joints, for example.

Further, the bed body 20 implements the upper leg raising operation in such a way that the upper leg section 22c is turned around its end part on the curved section 22b side. An angle $\beta$ by which the upper leg section 22c is raised (an angle $\beta$ by which the upper leg section 22c is raised above the horizontal plane) at this time is referred to as an upper leg raising angle $\beta$.

Note that, the lower leg section 22d may operate in conjunction with the movement of the upper leg section 22c. In this case, a lower leg raising angle (a lower leg lowering angle) may be used instead of the upper leg raising angle.

Figure 1C:
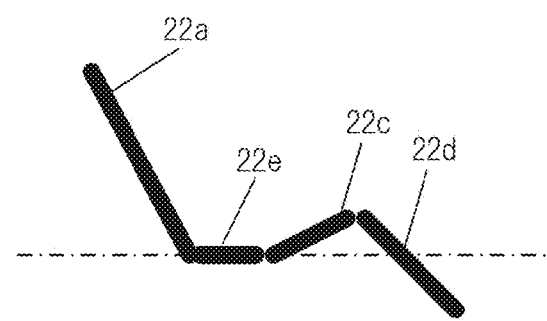
FIG. 1C is a diagram illustrating the configuration of a section of a bed apparatus in another embodiment of this disclosure.

Note that, as illustrated in FIG. 1C, the bed body 20 may be constituted of a seat section 22e instead of the curved section 22b. In this case, for example, the back section 22a has a length of approximately 785 mm and the seat section 22e has a length of approximately 195 mm. The seat section 22e typically does not turn and supports a waist part (buttocks) of the user.

The section 22 is supported by the upper frame 24. The upper frame 24 may have any shape as long as it can support the section 22. Further, the lower frame 26 may have any shape as long as it can support the upper frame 24 supporting the section 22.

The elevating mechanism 28 is for adjusting the height of the upper frame 24 and configured to adjust the height of the bed body 20. Here, the height of the bed body 20 typically indicates the height from an installed surface (ground surface) to the upper frame 24 (floor height). Note that, the height of the bed body 20 may be the height from the ground surface to the section 22.

The elevating mechanism 28 is implemented by a link mechanism or a driving device (driving mechanism) such as an actuator, for example.

Figure 2:
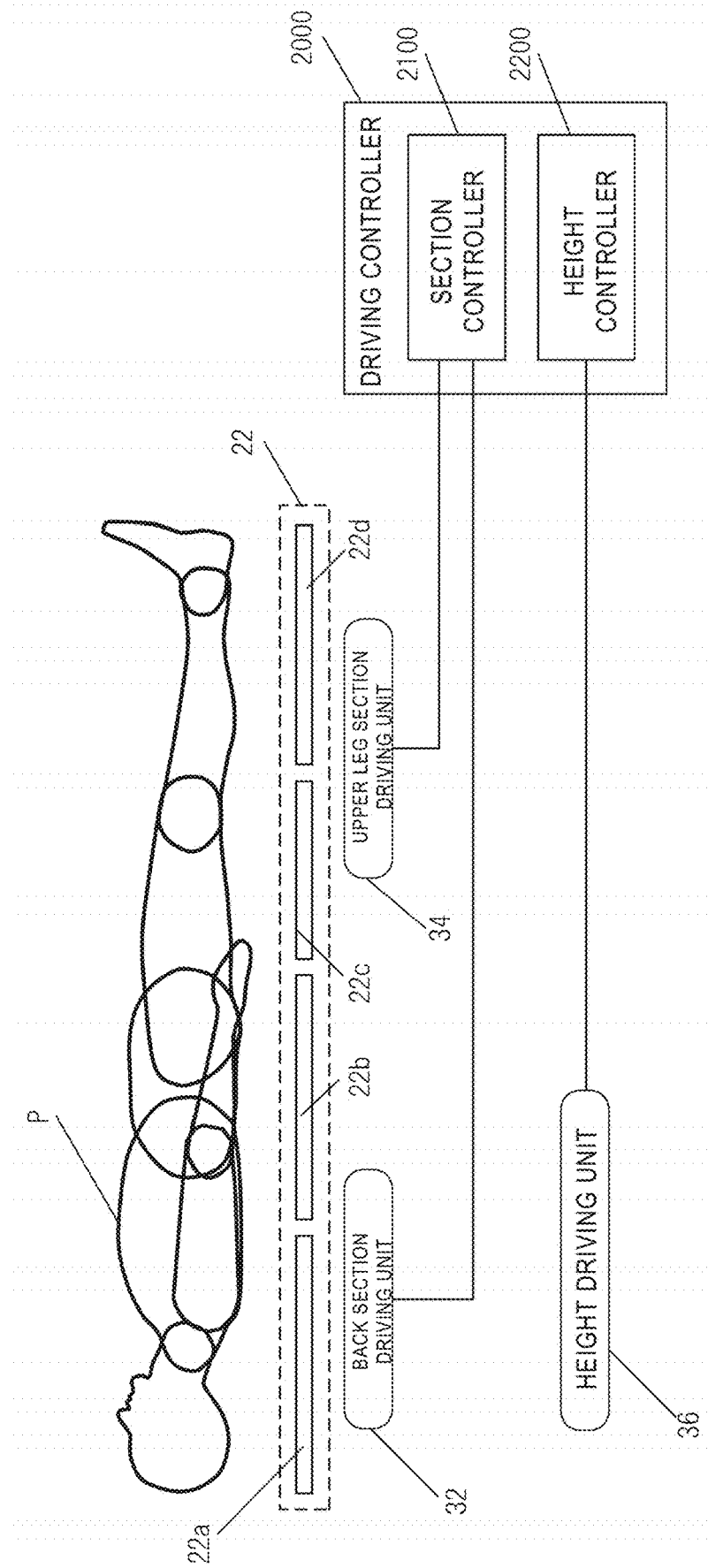
FIG. 2 is a diagram illustrating an operation of a bed apparatus in an embodiment of this disclosure.

FIG. 2 is a diagram illustrating the operation of the bed body 20. The bed body 20 has driving units for driving the respective sections.

A back section driving unit 32 is capable of elevating the back section 22a. For example, the back section driving unit 32 is an actuator, and the back section 22a is connected to a rod end of this actuator via a link mechanism.

An upper leg section driving unit 34 is capable of elevating the upper leg section 22c. For example, the upper leg section driving unit 34 is an actuator, and the upper leg section 22c is connected to a rod end of this actuator via a link mechanism.

In addition, the driving units are connected to a driving control unit 2000. The driving control unit 2000 functions as a section control unit 2100 that is configured to control the back section driving unit 32 and the upper leg section driving unit 34 and as a height control unit 2200 that is configured to control a height driving unit 36.

The section control unit 2100 implements a back raising function and is configured to elevate the back section 22a by controlling the back section driving unit 32. Specifically, the section control unit 2100 advances the rod of the actuator which is an example of the back section driving unit 32. In response to the advance of the rod of the actuator, the back section driving unit 32 applies its driving force to the back section 22a via the link mechanism. With the application of the driving force, the back section 22a turns with the foot side of the back section 22a as its fulcrum to thereby elevate its head side.

At this time, the curved section 22b joined to the back section 22a is also elevated. For example, one end side of the curved section 22b is joined to the back section 22a whereas the other end side thereof is joined to the upper frame 24. In addition, the curved section 22b is capable of curving, and may be elevated at its end part on the back section 22a side along with the elevation of the back section 22a. Further, the curved section 22b may be configured to be extendable and contractible.

The section control unit 2100 implements an upper leg raising function and is configured to elevate the upper leg section 22c by controlling the upper leg section driving unit 34. Specifically, the section control unit 2100 advances the rod of the actuator which is an example of the upper leg section driving unit 34. In response to the advance of the rod of the actuator, the upper leg section driving unit 34 applies its driving force to the upper leg section 22c via the link mechanism. With the application of the driving force, the upper leg section 22c turns with the curved section 22b side of the upper leg section 22c as its fulcrum to thereby elevate its lower leg section 22d side.

At this time, the lower leg section 22d may turn in conjunction with the upper leg section 22c. For example, when the lower leg section 22d is connected to the upper leg section 22c via the link mechanism, the lower leg section 22d is elevated at its one end on the upper leg section 22d side along with the elevation of the upper leg section 22c on the lower leg section 22d side. Along with the elevation of one end of the lower leg section 22d, the other end thereof located on the foot side of the bed body 20 is lowered. At this time, the other end of the lower leg section 22d is lowered below the upper frame 24, but may be joined to the upper frame 24 instead.

Meanwhile, the height control unit 2200 implements a function of elevating and lowering the bed body 20 and is configured to increase or decrease the height of the upper frame 24 by controlling the height driving unit 36.

For example, the height driving unit 36 is provided between the upper frame 24 and the lower frame 26, and one end of an actuator which is an example of the height driving unit 36 is provided to the lower frame 26. In response to an advance of a rod of this actuator, the height driving unit 36 pushes up and elevates the upper frame 24 via the link mechanism. Thereby, the floor height of the bed body 20 increases.

Note that, the driving units perform operations opposite from the above operations if the driving control unit 2000 controls the driving units so that the units perform the opposite operations. In other words, by retracting the rod of the actuator, the driving units perform operations such as a back lowering operation, an upper leg lowering operation, and a floor height lowering operation.

3. Configuration of Mattress

3.1 Overall Configuration of Mattress

Figure 3:
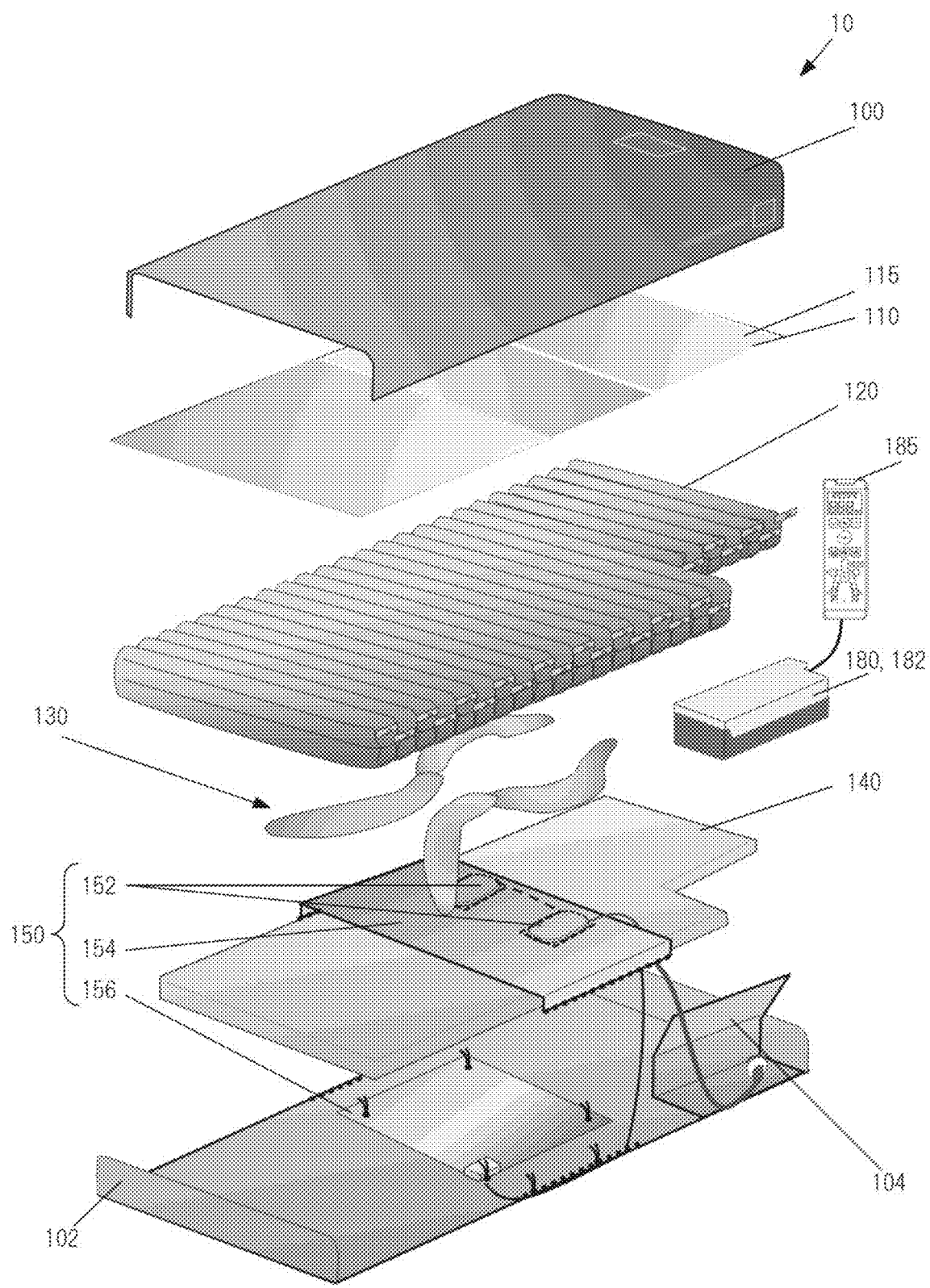
FIG. 3 is a view illustrating the configuration of a mattress in an embodiment of this disclosure.

The configuration of the mattress 10 is described. FIG. 3 is an exploded view schematically illustrating the configuration of the mattress 10.

The mattress 10 is wholly covered with covers (a top cover 100 and a bottom cover 102). The top cover 100 and the bottom cover 102 are configured to be attachable and detachable. Here, the top cover 100 and the bottom cover 102 may be formed integrally.

In addition, the mattress 10 includes, inside the covers, a top urethane 110, a main cell 120, a sub-cell 130, and a bottom cushion 140 in the order from an upper layer.

The top urethane 110 is placed on air cells and constituted of a urethane sheet, for example. In addition, a glide sheet 115 is provided between the top urethane 110 and the top cover 100 which is a surface fabric. The glide sheet 115 is made of a low frictional resistance material and provided for making the top cover 100 and the top urethane 110 easy to slip against each other. Note that, the glide sheet 115 may be provided as needed.

The main cell 120 is constituted of an air cell group formed of multiple air cells. The main cell 120 is connected to a pump 180 via an air feed tube (not illustrated). The main cell 120 is sometimes also referred to as a body cell.

The pump 180 is connected to each of the air cells. For example, the pump 180 is connected by dividing the cells, constituting the main cell 120, into one or multiple lines (groups) and connecting air feed tubes to these lines, respectively. Then, the air is fed from the pump 180 to the main cell 120 to inflate the main cell 120. Besides, by releasing valves provided between the pump 180 and the main cell 120 or forcibly discharging the air, it is possible to discharge the air from the main cell 120 and deflate the main cell 120.

In addition, the pump 180 is also connected to the sub-air cell (sub-cell) 130. As in the manner described above, the pump 180 is capable of feeding the air to the sub-cell 130 and discharging the air (releasing valves or forcibly discharging the air).

Meanwhile, the pump may be housed in a pump housing compartment in the mattress 10. For example, in FIG. 3, a compartment 104 for housing the pump is provided at or near a corner part of the mattress 10. Here, the compartment 104 is provided with a pump cover. By providing the pump part in one compartment of the mattress 10 in this manner, it is possible to make the pump part united with the mattress 10.

Note that, the pump 180 may be provided separately from the mattress 10. In this case, no compartment for housing the pump 180 has to be provided in the mattress 10.

In addition, the pump 180 may be provided integrally with a control device as a pump unit 182. The pump unit 182 includes the pump 180, the control device that is configured to control the pump 180, and a memory device that is configured to store information and programs necessary for the operation. For example, the control device included in the pump unit 182 can control the operation of the pump 180 according to a signal input from a user interface device.

Here, the control device may include not only a control unit such as a CPU but also other control devices. For example, in the case where the pump 180 is a diaphragm pump or an electromagnetic pump, the control device may include an electromagnetic valve that is configured to control the pump and a driving circuit and a driver circuit that are configured to control them, for example.

In addition, a user interface panel 185 may be connected as an example of the user interface device. To put it differently, the user interface panel 185 is a device that is configured to output a manipulation signal to the control device.

Note that, the control device that controls the pump 180 may be provided in any device. Although the control device is provided integrally with the pump as the pump unit 182 in this embodiment, the user interface panel 185 may have a function of the control device instead, for example.

The sub-cell 130 is an air cell that is used to change the body position of the user and support the body of the user. The sub-cell 130 is sometimes also referred to as a support cell, a body position changing cell, or an SF cell. Although the sub-cell 130 is disposed below the main cell 120 in this embodiment, the sub-cell may be disposed above the main cell 120 or disposed below the bottom cushion 140.

The bottom cushion 140 is a support member that is disposed below the main cell 120. For example, the bottom cushion 140 is made of a member such as urethane or hard cotton. In addition, the bottom cushion 140 may be provided with a sensor 150 that is configured to detect the sleeping position of the user and the like.

The sensor 150 is a sensor using a capacitance sensor. The sensor 150 has a positive electrode 152 and a GND sheet 156 to which a case housing a GND substrate is attached. The GND sheet 156 may also function as a ground (GND) electrode.

In addition, the sensor may be provided with a sensor cover 154 in order to dispose the positive electrode 152 above the bottom cushion 140. For example, the sensor cover 154 has a shape capable of housing the positive electrode 152, such as a pocket. By housing the positive electrode 152 in the pocket of the sensor cover 154, it is possible to position the positive electrode 152 relative to the mattress 10.

Note that, the sensor cover 154 is a waterproof cover for securing the positive electrode 152 to the bottom cushion 140 (or a cover of the bottom cushion). Here, for example, other methods may be used to secure the positive electrode 152 as long as it can position the positive electrode 152 relative to the mattress 10. For example, as a method for positioning the positive electrode 152, a member for securing the positive electrode 152 may be provided to the bottom cushion 140, or a recess for housing the positive electrode 152 may be formed in the bottom cushion. Alternatively, the bottom cushion 140 and the positive electrode 152 may be formed integrally so that the positive electrode is immovable relative to the bottom cushion.

In addition, the positive electrode 152 is a member housing a substrate, and is housed in an oblong case in this disclosure. The positive electrode 152 is formed by attaching a conductive sheet (e.g., a conductive sheet 152a illustrated in FIG. 4B to be described later) on the backside (on the side which is brought into contact with the bottom cushion 140 located below the positive electrode when the positive electrode is installed).

The positive electrode 152 may have other shapes. For example, the positive electrode 152 may have any of a round shape, an oval shape, a rectangular shape (e.g., a rectangle and a square), and a polygonal shape. In addition, the positive electrode 152 is provided with the conductive sheet on the back side thereof. Here, the conductive sheet may be formed to cover the entire backside of the positive electrode 152, or alternatively formed to cover a part of the positive electrode 152.

Further, the positive electrode 152 and the GND sheet 156 sandwich the bottom cushion 140 therebetween. Here, the whole or a part of the GND sheet 156 has a function of a conductive sheet. In other words, the whole GND sheet 156 may be made of a material functioning as a conductive sheet (e.g., a sheet having a conductive ink printed thereon or a sheet made of a conductive fiber), or alternatively, the GND sheet 156 may be formed by attaching or embedding a conductive sheet to or in a part of a sheet made of a certain material.

Here, the bottom cushion 140 is deformed when the user rides on the mattress 10. When the bottom cushion 140 is deformed, the distance between the positive electrode 152 and the GND sheet 156 changes and thus the capacitance also changes. This change of the capacitance is acquired by a judgment unit 1010 to be described later, whereby the body position and the location of the user can be acquired.

Note that, the bottom cover 102 may have an opening (e.g., an opening having a fastener) for the sensor 150 so that the sensor 150 is easily accessible through this opening.

In addition, the positive electrode 152 may be disposed near the buttocks of the user, for example. To put it differently, the positive electrode may be disposed at a position above the seat section 22e or near the foot side of the curved section 22b. Further, although two left and right positive electrodes are provided as the positive electrode 152 in this embodiment, the number of the positive electrodes 152 may be one, or may be three or more.

3.2 Configuration of Sensor

The configuration of the sensor 150 is described in detail below. As has been described in FIG. 3, the sensor 150 has such a structure that the bottom cushion 140 is sandwiched between the positive electrode 152 and the GND sheet 156 of the sensor.

When the user lies on the mattress 10, the shape of the bottom cushion 140 is deformed by the user's load. With the change of the shape of the bottom cushion 140, the distance between the positive electrode 152 and the GND sheet 156 changes. With the change of the distance between the positive electrode 152 and the GND sheet 156, a capacitance value between the positive electrode 152 and the GND sheet 156 changes. Here, the bottom cushion 140 may have any form such as urethane, hard cotton, or air cells as long as the bottom cushion 140 is a flexible elastic body with a relative permittivity of 8.1 or lower (such as polyester resin).

In addition, in FIG. 3, the positive electrode 152 and the GND sheet 156 are arranged in this order from the top. The positive electrode 152 and the GND sheet 156 may be arranged in the reverse order, but the layout of FIG. 3 is preferable in order to prevent the positive electrode 152 from being affected by the bed section (prevent electric charges from the positive electrode 152 from being applied on the bed).

Figure 4A:
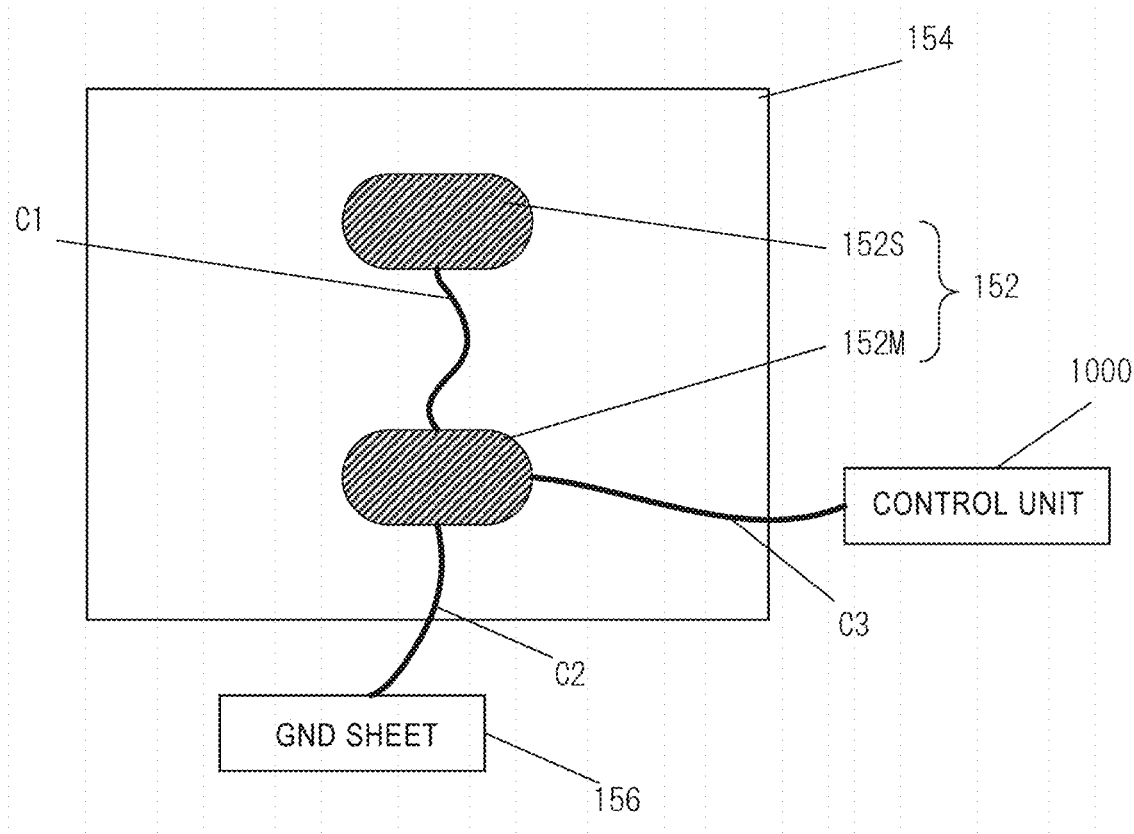
FIG. 4A is a diagram illustrating the configuration of a sensor in the embodiment of this disclosure.
Figure 4B:
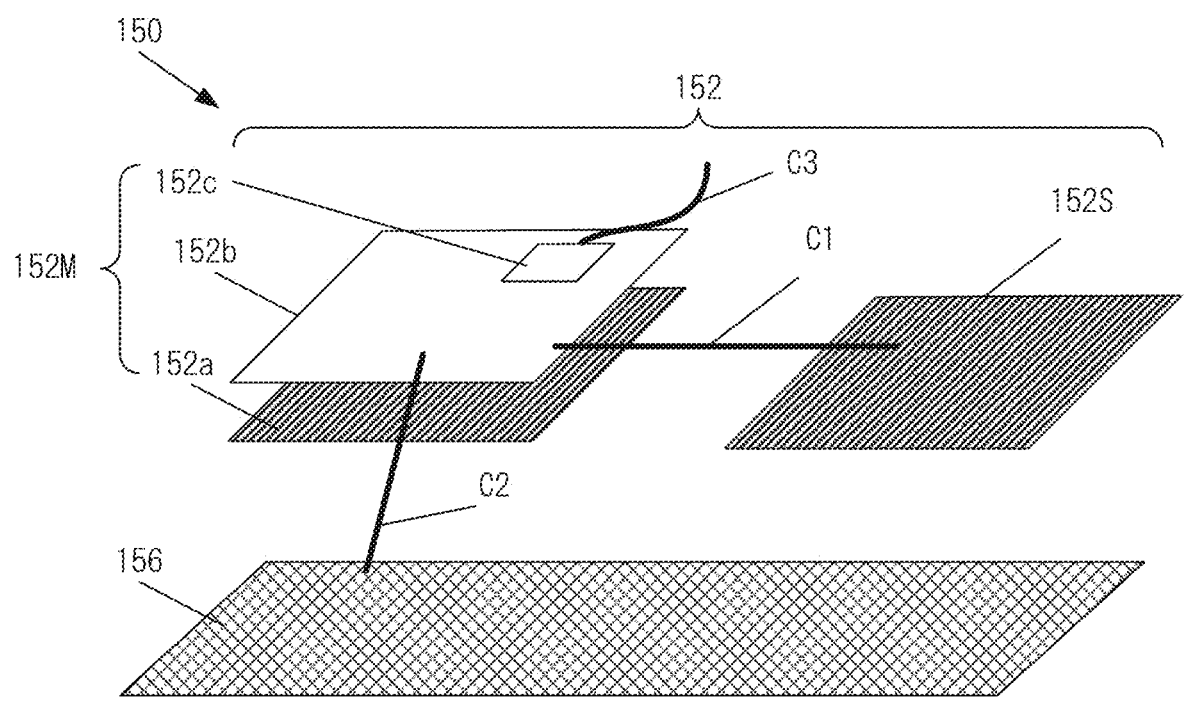
FIG. 4B is another diagram illustrating the configuration of the sensor in the embodiment of this disclosure.

FIGS. 4A-B are an explanatory diagrams of the positive electrode 152. FIG. 4A is a diagram in which the positive electrode 152 disposed in the sensor cover 154 is viewed from the front surface (the main cell 120 side). Meanwhile, FIG. 4B is a schematic explanatory diagram illustrating the structure of the sensor 150.

As illustrated in FIG. 4A, in this embodiment, the positive electrode 152 has two positive electrodes 152M and 152S. Here, the positive electrode 152M is a main positive electrode and is provided with a control unit 152c as illustrated in FIG. 4B. Meanwhile, the positive electrode 152S is a sub-positive electrode. Although two left and right positive electrodes are provided as the positive electrode 152 in this embodiment, the number of the positive electrode 152 may be one, or may be three or more. In this case, the positive electrode 152 may have such a structure that one main positive electrode 152M and multiple sub-positive electrodes 152S are provided.

The positive electrode 152M and the positive electrode 152S are connected to each other through a coaxial cable C1. In other words, the coaxial cable C1 is a cable that connects the positive electrodes 152 to each other when the multiple positive electrodes 152 are provided.

In addition, the positive electrode 152M is connected to the GND sheet 156 through a cable C2. Further, the positive electrode 152M is connected to a control unit 1000 through a cable C3. Here, the cables C2 and C3 may be normal lead wires or may be coaxial cables.

This positive electrode 152 is connected to the control device (such as the control unit 1000 in FIGS. 7A-B) through the cable C3. Here, when the positive electrode 152 has multiple positive electrodes 152M for example, each of the positive electrodes 152M may be connected to the control unit 1000. The positive electrode 152 may also have such a structure that the positive electrode 152M and one or multiple positive electrodes 152S are connected to each other through the coaxial cable C1 and the positive electrode 152M is connected to the control device (the control unit 1000).

In addition, the control device may be a dedicated control device such as a control box or may be a user interface device such as a user interface remote controller. Alternatively, the control device may be a terminal device which has an application installed therein and can be connected to the mattress 10.

As illustrated in FIG. 4B, the positive electrode 152M at least has the conductive sheet 152a and a sensor substrate 152b. For example, the positive electrode 152M is made by attaching the conductive sheet 152a to a case housing the sensor substrate 152b. The conductive sheet 152a is a conductive sheet printed with carbon ink, for example. In addition, the controller 152c may be disposed on the sensor substrate 152b. Further, the positive electrode 152S at least has a conductive sheet.

As illustrated in FIG. 3 and FIG. 4B, the GND sheet 156 is disposed so as to sandwich the bottom cushion 140 between itself and the positive electrode 152. The GND sheet 156 is made by attaching a conductive sheet to the case housing the GND substrate. The conductive sheet in this GND sheet 156 is also a conductive sheet printed with carbon ink.

The sensor substrate 152b uses the controller 152c, functioning as a measurement unit, to measure a capacitance value obtained by the change of the distance between the positive electrode 152 and the GND sheet 156. Then, the controller 152c performs A/D conversion on the value and outputs the resultant value to the control unit (control device). Here, each case is designed to protect the substrate and a connection unit between the substrate and the cable.

For example, the controller 152c acquires an analog signal from the sub-positive electrode 152S through the coaxial cable C1. At this time, it is preferable that the sensor substrate 152b can acquire a signal, obtained by cutting a high-frequency component which is noise, by using the coaxial cable C1.

The controller 152c performs A/D conversion (analog/digital conversion) on analog signals (analog values) from the two positive electrodes 152M and 152S together. Then, the controller 152c sends the signal subjected to digital conversion (digital signal) to the control unit 1000.

Note that, although the controller 152c included in the sensor substrate 152b outputs the final signal (digital signal), the control device (such as the control unit 1000) may alternatively receive the signal and implement the same processing.

In addition, the conductive sheet 152a may be provided, at its upper surface, with a shield for the coaxial cable and a layer with the same potential as that of the GND sheet. Thereby, it is possible to prevent a human body lying on the mattress from affecting the capacitance.
(Other Configuration 1)

Note that, although the sensor 150 has the positive electrode 152 and the GND sheet 156 in the configuration of FIGS. 3 and 4A-B, the sensor 150 may have the positive electrode 152 (sensor) only.

Figure 5A:
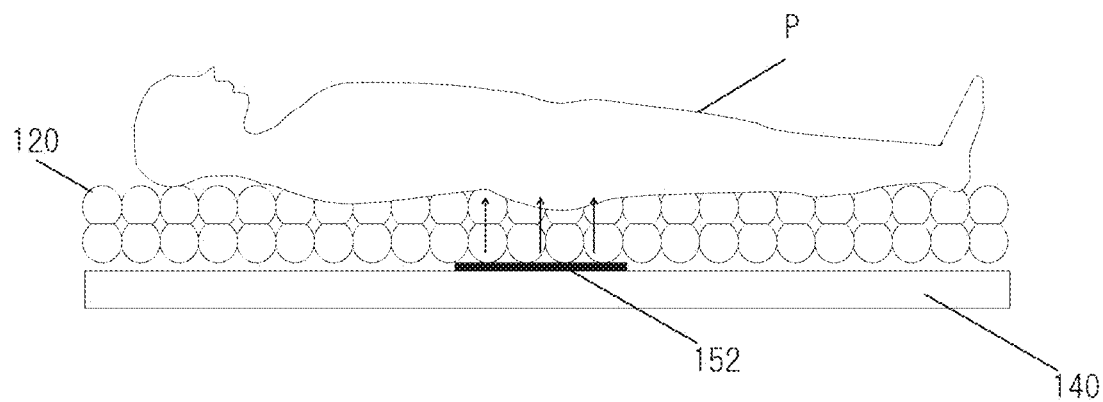
FIG. 5A is an explanatory diagram of an operation in the embodiment of this disclosure.
Figure 5B:
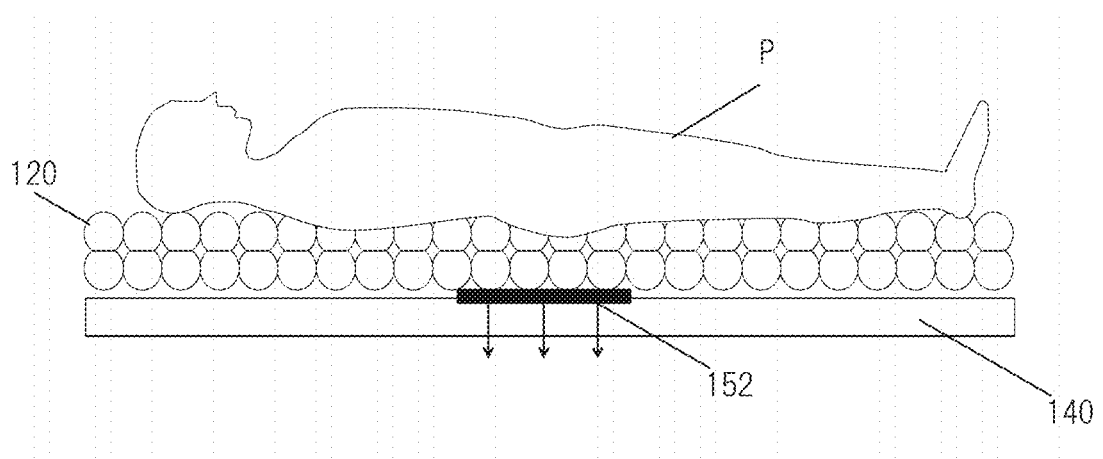
FIG. 5B is an explanatory diagram of an operation in another embodiment of this disclosure.

For example, FIGS. 5A-B are diagrams illustrating a state in which the user P is lying on the main cell 120. Note that, although the main cell 120 is placed on the bottom cushion 140, it may be placed on the section of the bed apparatus instead.

Here, in the case where no GND sheet 156 is provided, as illustrated in FIG. 5A for example, the sensor of the positive electrode 152 is disposed while facing the person (directed upward in FIG. 5A). This enables the sensor 150 to accumulate electric charges in the user P instead of the GND sheet 156. The sensor 150 may detect a change of the capacitance through the accumulation of electric charges.

Alternatively, as illustrated in FIG. 5B, the sensor of the positive electrode 152 is disposed while facing the bottom cushion 140 (directed downward in of FIG. 5B). This enables the sensor 150 to accumulate electric charges in the bed section. The sensor 150 may detect a change of the capacitance through the accumulation of electric charges.
(Other Configuration 2)

Meanwhile, the detection range of the sensor 150 may be changed by using different members in combination.

The bottom cushion 140 is deformed when a load is applied from the user on the mattress. For example, a region of the bottom cushion near the buttocks of the user P is likely to be deformed largely. Accordingly, as illustrated in of FIG. 5C, by arranging different cushion members (e.g., 140a and 140b) in the deformable region of the bottom cushion 140, the deformation range of the cushion changes. By changing the deformation range of the cushion, it is possible to enlarge the detection range of the sensor 150.

Note that, the same effect can be implemented by using two different materials. For example, since the main cell 120 exists between the bottom cushion 140 and the user in this embodiment, the main cell 120 can expand the deformation caused by the sinking of the user and transmits it to the bottom cushion 140. For example, this effect can be implemented by the air cells and the bottom cushion 140 instead of the multiple bottom cushions 140 illustrated in FIG. 5C. In this case, the main cell 120 being constituted of the air cells corresponds to the bottom cushion 140a whereas the bottom cushion 140 corresponds to the bottom cushion 140b.

Figure 5C:
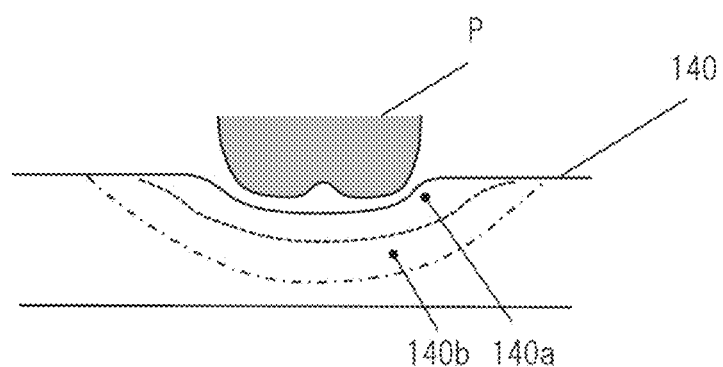
FIG. 5C is a diagram illustrating the configuration of cushion members in an embodiment of this disclosure.

Thereby, in FIG. 5C, only a sinking region near the buttocks of the user P is deformed in the layer 140a (the main cell 120) located right under the buttocks, whereas the sinking of the user is transmitted in a wider area in the layer 140b (the bottom cushion 140) located below the above layer.

(Other Configuration 3)

Meanwhile, if there is a part where a person does not want to cause the sensor 150 to detect the user, by cutting the bottom cushion in its thickness direction, it is possible to stop the deformation of the cushion in that part. For example, the sensor 150 is disposed in each of body portions such as the back, the buttocks, and the foot part. Then, if a person wants to detect the positions of the respective portions individually, by cutting the bottom cushion according to these portions, each sensor 150 can measure a change of the capacitance in its corresponding portion only without being affected by the sinking of other portions.

(Sole Configuration)

Note that, although the mattress 10 includes the sensor 150 in this embodiment, the sensor 150 may be provided solely as a sensor device instead. In other words, the sensor device equipped with the positive electrode 152, or equipped with the positive electrode 152 and the GND sheet 156 can be mounted on an existing mattress. Alternatively, it may be provided as a sensor system equipped with a control device and the sensor 150.

For example, the sensor device may have such a structure that the positive electrode 152 and the GND sheet 156 are arranged so as to sandwich an elastic body constituting any of an existing mattress, sheet, cushion, and mat, for example. This enables the sensor device to be applied in a support that has the elastic body and is designed to support an object on the elastic body.

4. Configuration of Cell

Next, the configuration of each cell (the main cell 120 and the sub-cell 130) is described with reference to FIG. 6.

The main cell 120 is divided into one or multiple lines, and connected to the pump 180 via air feed tubes. For example, in FIG. 6, the main cell 120 is connected to the pump 180 while being divided into lines A to C. Specifically, the pump 180 feeds the air to and/or discharge the air from cells 120A through an air feed tube 184. The cells 120A are connected to the line A, and their pressure changes like those of other cells of the line A do.

The pump 180 is capable of switching the line to and/or from which the air is fed and/or discharged by means of switching valves, for example. The pump 180 may feed and/or discharge the air by switching the line sequentially from one line to another, or alternatively may feed and/or discharge the air to/from all the lines by making the lines communicate with each other. In addition, air feed tubes may be connected from the pump 180 to the lines respectively or alternatively to all the air cells, respectively.

Further, although the main cell is divided into the three lines A to C in FIG. 6, it may be divided into another number of lines. The main cell is preferably divided into multiple lines. Alternatively, a part of the main cell may be defined as a separate line. For example, the pump 180 may feed the air to and/or discharge the air from only the head side or the foot side of the user P which is defined as a separate line. Still alternatively, the entire main cell 120 may be defined as the same line.

The sub-cell 130 includes an upper sub-cell 130S which is designed to mainly support the upper half (the shoulders) of the user P and a lower sub-cell 130W which is designed to mainly support the lower half (the waist and thighs) of the user P.

In addition, the sub-cell 130 is disposed on the left and right of the user P. The upper sub-cell 130S includes an upper left sub-cell 130SL which is located on the left side when the user is in a supine position and an upper right sub-cell 130SR. Meanwhile, the lower sub-cell 130W includes a lower left sub-cell 130WL which is located on the left side when the user is in a supine position and a lower right sub-cell 130WR.

Further, the sub-cell 130 is connected to the pump 180 through separate lines from those of the main cell 120. For example, the sub-cell has a line SSL through which the air is fed to and/or discharged from the upper left sub-cell 130SL, a line SWL through which the air is fed to and/or discharged from the lower left sub-cell 130WL, a line SSR through which the air is fed to and/or discharged from the upper right sub-cell 130SR, and a line SWR through which the air is fed to and/or discharged from the lower right sub-cell 130WR. The pump 180 may be connected to these sub-cells 130 through air feed tubes respectively, or alternatively may switch the sub-cell 130 to and/or from which the air is fed and/or discharged by means of switching valves.

Note that, these lines of the sub-cell 130 may be provided as different lines. For example, in the sub-cell 130, the sub-cells which are located diagonally opposite each other, such as the upper left sub-cell 130SL and the lower right sub-cell 130WR, may be set as the same line. Alternatively, in the sub-cell 130, the sub-cells which are located on the same (left or right) side, such as the upper left sub-cell 130SL and the lower left sub-cell 130WL, may be set as the same line.

In addition, the pump 180 may be connected to the lines, to and/or from which the air is fed and/or discharged, through air feed tubes respectively and feed the air to and/or discharge the air from these lines respectively, or alternatively may feed and/or discharge the air by switching the line using switching valves. Alternatively, the pump 180 may be connected using air feed tubes and switching valves in combination.

Further, the pump 180 may be constituted of one pump or may be constituted of multiple pumps.

5. Functional Configuration

Figure 7A:
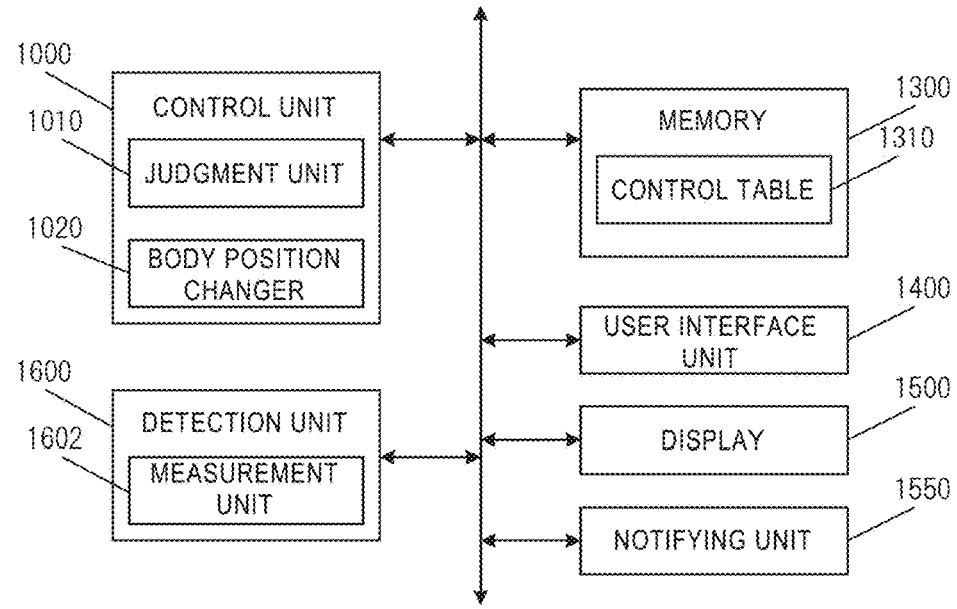
FIG. 7A is a diagram illustrating a functional configuration in the embodiment of this disclosure.
Figure 7B:
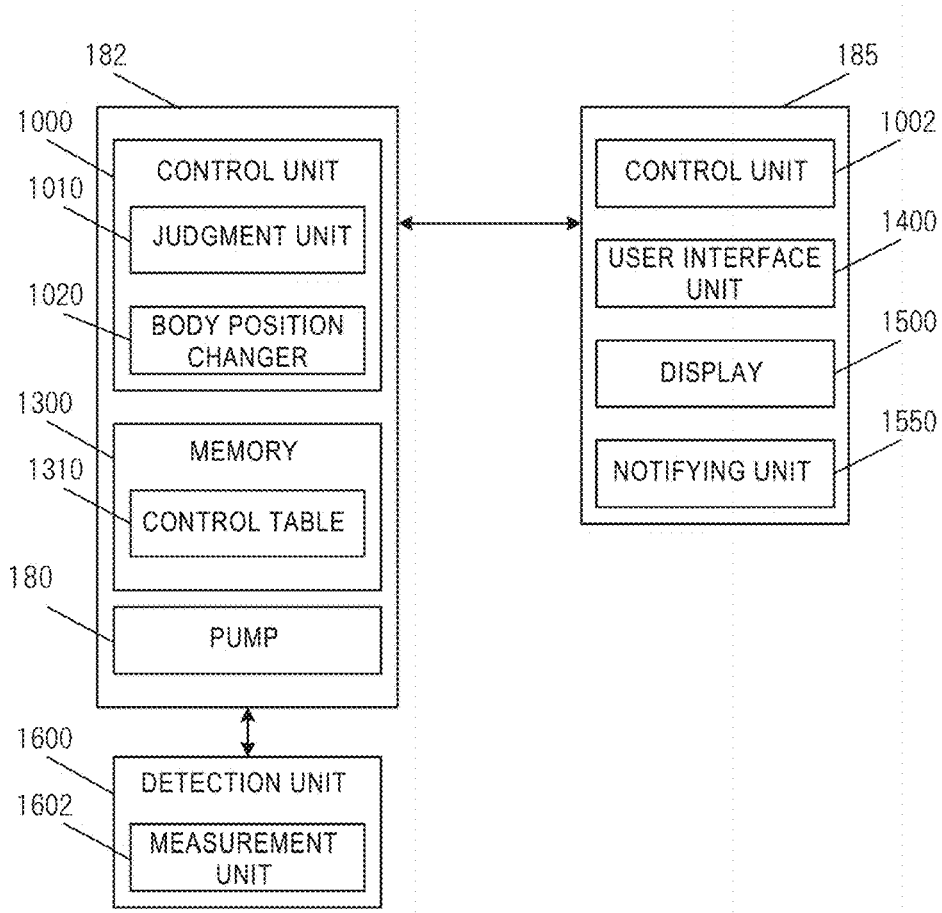
FIG. 7B is another diagram illustrating a functional configuration in the embodiment of this disclosure.

FIGS. 7A-B are diagrams illustrating the functional configuration of the bed system 1 (mattress 10). The functions illustrated in FIG. 7A are functions for controlling the mattress 10 and are implemented by the control device that controls the mattress 10. Note that, in the case where the bed body 20 and the mattress 10 operate in collaboration with each other, the functions illustrated in FIG. 7A may be implemented by the control device of the bed body 20.

The control unit 1000 is a functional unit for controlling the entire mattress 10. The control unit 1000 implements various functions by retrieving and executing various programs stored in a memory 1300, and is constituted of one or multiple arithmetic units (such as CPUs (Central Processing Units)), for example.

In addition, the control unit 1000 may also be capable of controlling the main cell 120 which is constituted of the air cells and the sub-cell 130. Here, the control unit 1000's control over the air cells indicates that it controls the pressure of the air cells. With a change of the pressure of the air cells, the air cells inflate or deflate. To put it differently, the control unit 1000 is capable of controlling the size (the degree of inflation) of the air cells.

For example, the control unit 1000 is configured to feed the air to and discharge the air from the air cells by controlling the pump 180. Thereby, the control unit 1000 can perform control to increase and decrease the pressure of the air cells. When decreasing the pressure of the air cells, the control unit 1000 may discharge the air by releasing valves or alternatively may forcibly discharge the air by controlling the pump 180.

In addition, the control unit 1000 may function as the judgment unit 1010 and a body position changer 1020 by retrieving and executing programs from the memory 1300.

The judgment unit 1010 is configured to judge the state of the user based on information measured by a measurement unit 1602 and information detected by a detection unit 1600.

The judgment unit 1010 is capable of judging, as the state of the user, whether or not the user is on the bed and the body position of the user including the position (sleeping position) of the user and the posture (sleeping posture) of the user, for example.

For example, the judgment unit 1010 may judge which of a supine position, a prone position, and a lateral position (a right lateral position and a left lateral position) the user is in. In addition, the judgment unit 1010 may judge where the user is sleeping on the mattress. Further, the judgment unit 1010 may judge, as the posture of the user, which sitting position (a sitting position with his/her soles of feet on the floor or a long sitting position) the user is in.

The body position changer 1020 is configured to change the body position of the user by controlling the sub-cell 130. When the sub-cell 130 is arranged as illustrated in FIG. 6 for example, the body position changer performs control to inflate/deflate the sub-cells sequentially in the order of the lower right sub-cell 130WR, the upper right sub-cell 130SR, the upper left sub-cell 130SL, and the lower left sub-cell 130WL. By iterating the inflation/deflation of these sub-cells 130 in this manner, it is possible to change the body position by means of the Small Change method.

The memory 1300 is a functional unit in which various programs and various data required for the operation of the mattress 10 are stored. For example, the memory 1300 is constituted of a semiconductor memory, an HDD (Hard Disk Drive), and the like.

The memory 1300 may store a control table 1310. The control table 1310 is configured to store a control pattern which is the timing for inflating the sub-cell 130, for example. The body position changer 1020 controls the timing for the inflation operation of the sub-cell 130 based on the control pattern stored in the control table 1310.

A user interface unit 1400 is configured to accept manipulation inputs from the operator. Examples of the user interface unit include a user interface remote controller including one or multiple user interface buttons and a terminal device which is connected to the mattress and capable of displaying a user interface screen thereon (an information processor such as a smartphone and a tablet and a terminal device used in other medical systems, for example).

The user interface unit 1400 is capable of manipulating the mattress 10, but may also be capable of manipulating the bed body 20. In addition, the user interface unit 1400 may be added to a user interface unit of the bed body 20 as a user interface button which enables manipulation of the mattress 10.

A display 1500 is configured to display the state of the mattress and the manipulation state to the operator. The display 1500 is any of display devices including an LED lamp, a 7-segment LED, a liquid crystal display, and an organic EL panel. In addition, when the terminal device is connected to the mattress, the display 1500 uses a display device of the terminal device. Further, the display 1500 may be provided to the user interface unit 1400, or may alternatively be provided integrally with the user interface unit 1400 as a touch panel capable of touch manipulation.

A notifying unit 1550 is configured to notify the user and the operator. The notifying unit 1550 performs notifications in various ways by outputting an alarm and a beep with a speaker and the like, displaying a warning on the display 1500, generating vibrations by a vibrator, and generating flashes by a light emitting device, for example.

The detection unit 1600 is a sensor configured to detect various states. For example, the detection unit 1600 may detect the pressure of the air cells using a pressure sensor and detect the state of the mattress 10 and then the state of the bed body 20 using an angular sensor. These sensors may be embedded into the mattress 10 or alternatively may be provided outside the mattress. Alternatively, a sensor provided to the bed body 20 may acquire the detected value. An example of such a sensor in this embodiment is the sensor 150, for example.

When the detection unit 1600 functions as the sensor 150, the detection unit may further include the measurement unit 1602. The measurement unit 1602 is configured to measure a change of the capacitance, for example. Then, the measurement unit 1602 outputs a change value by which the capacitance has changed to the control unit 1000. Note that, the measurement unit 1602 may be implemented by the control unit 1000.

Note that, the mattress 10 may further include a function additionally required other than the configuration in FIG. 7A. For example, the mattress may further include a communicator for communicating with other terminal devices. Alternatively, the mattress may include a required configuration only. For example, the mattress has only to include at least the control unit 1000 and the memory 1300, and may include the user interface unit 1400, the display 1500, the notifying unit 1550, and the detection unit 1600 according to need.

FIG. 7A is a diagram illustrating the entire system 1 (mattress 10). For example, FIG. 7B illustrates an example of its specific configuration. The mattress 10 in FIG. 7B includes, in the pump unit 182, the function of the control device and the pump (the pump 180 of FIG. 3, for example). By controlling the pump 180, the control device discharges the air into the air cells and takes in the air from the air cells to control the pressure of the air cells.

In addition, the pump unit 182 has the control unit 1000 and the memory 1300 as the control device. Further, the pump unit 182 is connected to the user interface panel 185 and the detection unit 1600.

The user interface panel 185 has a control unit 1002 that is configured to control the user interface panel 185 itself, the user interface unit 1400, the display 1500, and the notifying unit 1550. The user interface panel 185 is configured to output a manipulation signal to the control unit 1000. The user interface panel 185 is also configured to display information and notify information based on a signal received from the control unit 1000.

Meanwhile, the detection unit 1600 is the sensor 150 for example, and can be added as needed.

Necessary information is transmitted and received among the pump unit 182, the user interface panel 185, and the detection unit 1600. For example, when the user interface device includes the control unit 1000 and the memory 1300, the user interface panel 185 may directly control the pump 180.

Alternatively, such control may be implemented using a terminal device such as a smartphone instead of the user interface device. This can be implemented by installing an application which implements the function of the user interface panel 185 in the terminal device and executing the application. Likewise, other configurations may be implemented by either the mattress or another control device.

Meanwhile, the pump unit 182 may be connected to the bed body 20. By connecting the pump unit to the bed body 20, it is possible to control the section and detect the section angle, for example.

Note that, in the pump unit 182, the control device (the control unit 1000 and the memory 1300) may be provided integrally with a control substrate of the pump 180, or alternatively may be provided separately from the pump 180 and connected to the pump.

6. Judgment of Sleeping Position

6.1 When Multiple Positive Electrodes are Provided

A description is given of a method for the judgment unit 1010 to judge the position (sleeping position) of the user on the mattress 10.

FIGS. 8A-B are charts illustrating the amount of change of the capacitance (the capacitance change value) observed when the user is located on the mattress. In other words, these are graphs illustrating the capacitance change value measured by the measurement unit 1602 and observed when the user changes its state from a state of being away from the bed (a state where the user is not on the mattress) to a state of being on the bed (a state where the user is on the mattress).

FIG. 8A is a graph illustrating a change of the capacitance observed when the user is sleeping at the center of the mattress 10. The vertical axis indicates the capacitance change value (pF) by which the capacitance has changed from the state of being away from the bed. Meanwhile, the left graph indicates the capacitance change value which is measured by the positive electrode 152 disposed on the right side of the buttocks of the user, and the right graph indicates the capacitance change value which is measured by the positive electrode 152 disposed on the left side of the buttocks of the user.

In this case, the capacitance change value by which the capacitance has changed from the state of being away from the bed is 0.70 pF on the right side of the buttocks and 0.80 pF on the left side of the buttocks. To put it differently, the capacitance changes value measured by the left and right sensors (positive electrodes 152) are substantially the same.

Meanwhile, FIG. 8B is a graph illustrating a change of the capacitance observed when the user is sleeping at an end part of the mattress 10. In this case, the capacitance change value by which the capacitance has changed from the state of being away from the bed is 0.20 pF on the right side of the buttocks and 1.00 pF on the left side of the buttocks.

In this way, when the user is sleeping at the end part of the mattress 10, the amount of change of the capacitance measured by one of the sensors (positive electrode 152) (on the left side of the buttocks in FIG. 8B) is twice as large as, or larger than, the amount of change of the capacitance measured by the other sensor (positive electrode 152) (on the right side of the buttocks in FIG. 8B).

By acquiring this amount of change, the judgment unit 1010 can judge to which side of the mattress the user is displaced while sleeping.

Note that, although the description has been given of the case where the sensor 150 is provided with two positive electrodes 152, the same goes for the case where the sensor is provided with three or more positive electrodes. By providing three or more positive electrodes, it is possible to judge the sleeping position based on the positional displacement not only in the lateral direction but also in the longitudinal direction, for example. By increasing the number of positive electrodes, it is possible to judge the sleeping position per body portion more finely and increase the sleeping position's detectable range on the mattress.

6.2 When One Positive Electrode is Provided

Note that, when the judgment unit 1010 judges the position (sleeping position) of the user on the mattress 10, the number of the positive electrodes 152 may be one. In this case, the judgment unit 1010 judges the sleeping position of the user together with other parameters.

For example, the judgment unit 1010 judges the sleeping position using one capacitance change value measured by the measurement unit 1602 in combination with cell's inner pressure information and a set weight value.

(1) Combination with Change of Inner Pressure 1

The control unit 1000 presumes the weight of the user from an air discharge time of the air cells (the main cell 120). FIG. 8C is a chart illustrating the result of measuring, for every weight of the user, a change of the inner pressure with the air discharge time. As illustrated in FIG. 8C, the air discharge time required from an inner pressure of 2 kPa to an inner pressure of 0.5 kPa is 32 seconds when the weight of the user is 30 kg, 40 seconds when the weight of the user is 59 kg, and 49 seconds when the weight of the user is 78 kg. In this way, the weight of the user and the air discharge time correlate with each other. Accordingly, the control unit 1000 presumes the weight of the user from the air discharge time based on this correlation.

Here, the capacitance change value of the sleeping position sensor observed when the state changes from the state of being away from the bed to the state of being on the bed differs depending on the weight. Here, a memory 1100 previously stores a table which stores, for every weight, the capacitance change value observed when the user is sleeping at the center (middle) of the mattress 10 and the capacitance change value observed when the user is located at the end part of the mattress 10.

Then, with reference to this table, the judgement unit 1010 judges the sleeping position of the user based on the weight of the user and the capacitance change value.

FIG. 9A is a chart illustrating, for each of the users having weights of 19 kg, 42 kg, and 64 kg respectively, the amount of change of the capacitance value from the state of being away from the bed for every sleeping position. As illustrated in FIG. 9A, the amount of change of the capacitance value of the sensor disposed at the center decreases as the user is located away from the center.

For example, the judgment unit 1010 cannot identify the sleeping position of the user even though a capacitance value of 0.22 is measured. However, by using it in combination with different parameters such as the weight of the user, the judgment unit 1010 can judge the sleeping position of the user.

Note that, as long as the weight of the user is identified, the judgment unit 1010 may judge the sleeping position of the user by comparing a capacitance value, calculated by a correlation function, with a capacitance change value actually measured.

(2) Combination with Inner Pressure 2

Note that, the control unit 1000 may presume the weight of the user by using a method based on an increase of the inner pressure of the air cells. When the user lies on the air cells (the main cell 120), the inner pressure of the air cells increases. FIG. 9B is a chart illustrating the result of measuring a change of the inner pressure with the weight of the user. FIG. 9B is a chart illustrating the amount of increase of the inner pressure observed when each of the users having weights of 20 kg, 40 kg, and 60 kg respectively lies on the air cells having an inner pressure of 2.5 kPa.

In this way, the control unit 1000 presumes the weight of the user from the amount of increase of the inner pressure. Then, the judgment unit 1010 judges the sleeping position of the user based on the weight of the user and the capacitance change value.

(3) Weight Setting

Note that, the weight of the user that is used by the control unit 1000 as a parameter may be set by the user interface unit 1400. In this case, the judgment unit 1010 may judge the sleeping position of the user based on the weight of the user thus set and the capacitance change value.

7. Application Example

According to this embodiment, it is possible to judge the sleeping position of the user on the mattress (the position of the user lying on the bed).

For example, the control unit 1000 may judge the sleeping position of the user and give a notice. The notice given by the control unit 1000 means to display the contents based on the judgment result on the display 1500 or to cause the notifying unit 1550 to notify the contents based on the judgment result. In addition, the notifying unit 1550 may give notifications by outputting a beep according to the contents based on the judgment result and outputting voice according to the contents based on the judgment result.

Meanwhile, the display 1500 and the notifying unit 1550 may be a terminal device which is an external device. For example, the terminal device includes smartphones held by persons such as a doctor, a medical staff, a family member, and a helper, and devices installed in a nurse station. For example, when the device of the embodiment described above is a control box of the bed apparatus, these functions can be implemented by connecting the control box to the terminal device via a communicator (for example, a function unit configured to perform communications by any of communication means such as a wireless LAN and LTE/4G/5G line). Alternatively, the notifying unit 1550 may be connected to a nurse call system and make a nurse call.

Meanwhile, the control unit 1000 may control the external device via the communicator according to the body position (the sleeping position and posture) of the user judged by the judgment unit 1010. For example, the control unit 1000 can perform control as follows.

Camera: The control unit 1000 is capable of switching ON/OFF a camera. For example, when the sleeping position of the user is at the end of the mattress (bed apparatus), the control unit 1000 may turn the camera ON from a viewpoint of predicting that the user is to move away from the bed or preventing the user from falling off the bed.

Air Conditioner: The control unit 1000 is configured to perform control over ON/OFF switching, temperature regulation, and operation mode switching of an air conditioner. For example, the control unit 1000 may control the air blowing direction of the air conditioner according to the sleeping position of the user so that the air from the air conditioner does not hit the user, and may perform control to turn ON the air conditioner if the user rolls over often.

Light: The control unit 1000 is capable of ON/OFF control and lightness control of a light. For example, the control unit 1000 may perform control to turn OFF the light if judging from the sleeping posture of the user that the user is sleeping. Meanwhile, when the sleeping position of the user is moved to the end of the bed apparatus, the control unit 1000 may predict that the user is to move away from the bed and perform control to turn ON the light.

Curtain: The control unit 1000 is capable of curtain open/close control. For example, the control unit 1000 may perform control to close the curtain if judging from the sleeping posture of the user that the user is sleeping. Meanwhile, when the sleeping position of the user is moved to the end of the bed apparatus, the control unit 1000 may predict that the user is to move away from the bed and perform control to open the curtain.

Door: The control unit 1000 is capable of door open/close control and locking/unlocking control. When the sleeping position of the user is moved to the end of the bed apparatus, the control unit 1000 may predict that the user is to move away from the bed and perform control to open the door or unlock the door.

TV: The control unit 1000 is capable of ON/OFF control and volume control of a TV. For example, the control unit 1000 may perform control to turn OFF the TV if judging from the sleeping posture of the user that the user is sleeping. In addition, the control unit 1000 may perform control to turn OFF the TV if judging that the user is not directed toward the TV.

The contents based on the judgment result are contents, judged by the judgment unit 1010, indicating that the user is not at the center of the mattress 10, that the user is at the end part of the mattress 10, and that the user is located close to the right side (left side) which is one side of the mattress 10, for example.

In addition, the control unit 1000 may judge the position of the user and give an "away from bed" notice. For example, if the capacitance change value measured by the measurement unit 1602 becomes equal to or larger than a predetermined threshold, the control unit 1000 gives the "away from bed" notice (for example, to display this result on the display 1500, to cause the notifying unit 1550 to give notifications by way of a beep or voice etc., to give notifications by emitting light by light emitting means).

Alternatively, when the multiple positive electrodes 152 are provided, the control unit 1000 may give notifications if a difference between the capacitance change values measured by these positive electrodes 152 is equal to or larger than a predetermined value.

8. Effect

As has been described above, according to this embodiment, the elastic body (the bottom cushion) is reliably deformed when the user lies on the mattress. Accordingly, unlike the existing method of detecting vibration, the method of this embodiment prevents the situation where the vibration becomes not easily transmitted depending on the thickness of the mattress, the shape of the section, and how the mattress is deformed, and thereby makes it possible to reliably judge the position of the user and the like.

In addition, according to this embodiment, the sleeping position of the user can be detected by the mattress by itself. Accordingly, this embodiment requires no bed frame for its configuration, and thus the sleeping position of the user can be measured easily in combination with an existing bed apparatus.

Further, this embodiment is constituted by including a conductive sheet, a case, a sensor substrate, and a cable. Accordingly, this embodiment requires no other detection devices and the like, thus preventing a size increase of the apparatus and enabling the apparatus to be manufactured at low cost as compared with the existing proximity sensor method and the like.

Furthermore, according to this embodiment, even when the load is kept applied, the sensor itself is hardly deformed and the bottom cushion is deformed instead. Thus, this embodiment brings about a nonconventional effect that the sensor is not easily broken.

In addition, according to this embodiment, the level of creep of the bottom cushion is limited relative to the distance in which a change of the capacitance is detected by the positive electrode. Thus, this embodiment brings about an effect that drift is less likely to occur.

Further, according to this embodiment, the detection distance is long and the detection is carried out at the bottom cushion located below the main cell. Thus, this embodiment brings about an effect of a wide detection range.

Furthermore, according to this embodiment, by using the air cells in combination, it is possible to perform calibration under two or more conditions by switching the inner pressure of the air cells when nobody is on the mattress, and thus reduce an error of the sensor.

In addition, according to this embodiment, it is possible to detect the state where nobody is on the mattress, and also calculate the weight of the user by the amount of change from this state. Besides, by using the weight values input to the air mattress and the like, it is possible to know the sleeping position more precisely.

Further, according to this embodiment, it is possible to know not only the sleeping position and the weight but also the amount of sinking, and regulate the inner pressure of the air cells according to these states.

9. Modification Example

Hereinabove, the embodiment of this disclosure has been described in detail with reference to the drawings. However, a specific configuration is not limited to that of this embodiment, and any design and the like within a range not departing from the gist of this disclosure are also included in the scope of claims.

In addition, a program running in the devices of this embodiment is a program controlling a CPU and the like (a program causing a computer to function) in order to implement the function of the above embodiment. Information dealt in these devices is, at the time of processing this information, temporarily accumulated in a temporary memory device (such as a RAM), then stored in a memory device such as various ROMs and HDDs, and then retrieved, modified, and written by the CPU as needed.

Here, a non-temporary recording medium storing the program may be any device including a semiconductor medium (such as a ROM, a nonvolatile memory card, and an SSD), an optical recording medium/magnetooptical recording medium (such as a DVD (Digital Versatile Disc), an MO (Magneto Optical Disc), a CD (Compact Disc), and a BD), and a magnetic recording medium (such as a magnetic tape and a flexible disc). The function of the above embodiment is implemented by executing the loaded program, and is also sometimes implemented by performing processing in cooperation with an operating system or other application programs and the like based on instructions from this program.

Meanwhile, in the case of distributing the program to the market, the program may be distributed by storing the program in a portable non-temporary recording medium or by transferring the program to a server computer connected via a network such as the Internet. In this case, a memory device of the server is naturally also included in this disclosure.

Meanwhile, the data described in the table in the above processing for the sake of convenience of description may be implemented by other methods. For example, the parameters in the table may be described directly in a program. In addition, the control unit may acquire an output by using an already learned model instead of acquiring an output in advance or with reference to a created table.

9.1 Configuration of Mattress

Figure 10:
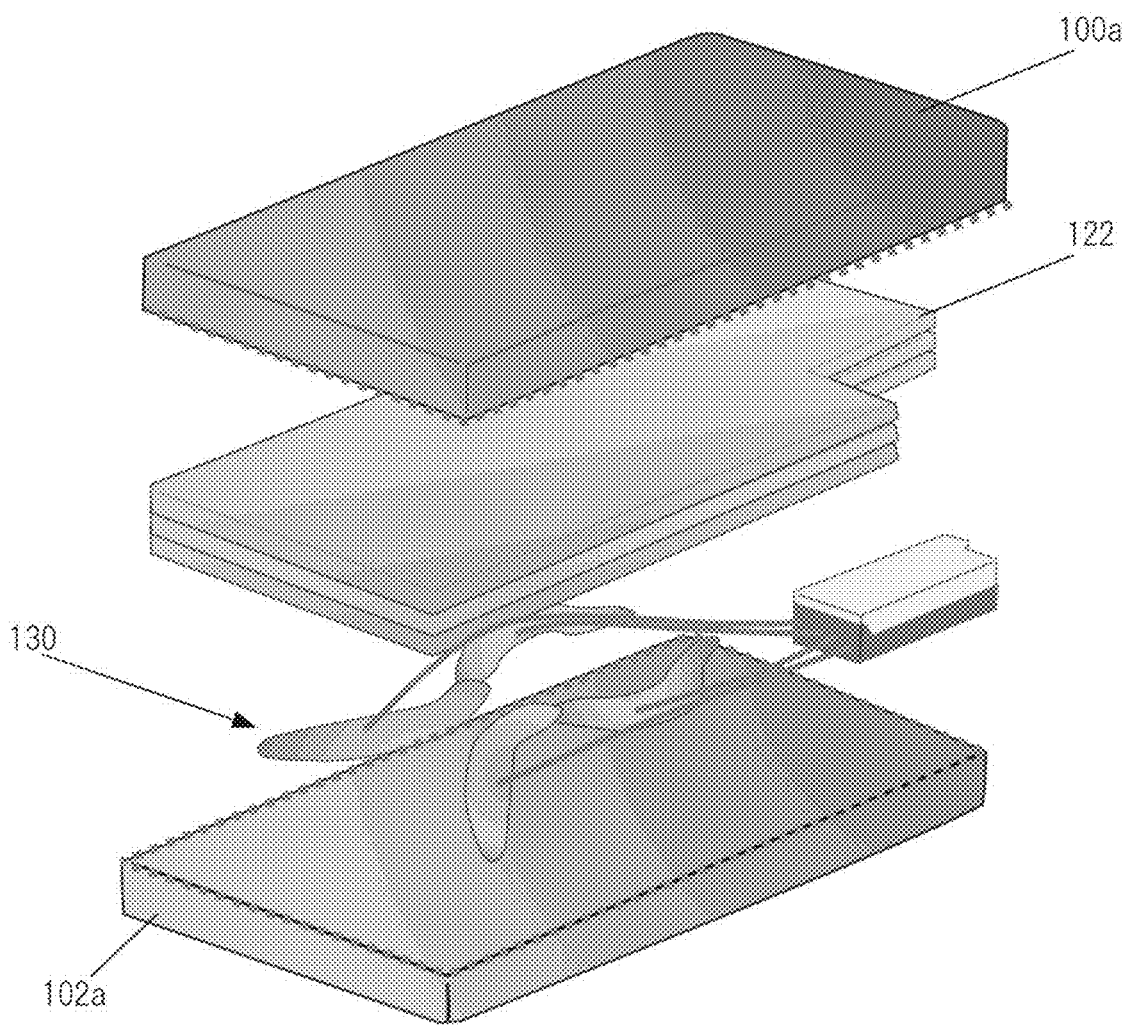
FIG. 10 is a view illustrating another configuration of the mattress of this disclosure.

Although the above embodiment has been described such that the mattress is constituted of the air cells, the mattress may have other configurations. For example, as illustrated in FIG. 10, a mattress disposed between an upper cover 100*a* and a lower cover 102*a* may be a urethane mattress 122. At this time, the sub-cell 130 may be disposed below the urethane mattress 122 as illustrated in FIG. 10. Note that, the sub-cell 130 may be disposed above the urethane mattress 122.

9.2 Layout of Sub-Cell

The above embodiment has been described such that the sub-cell 130 is provided inside the air mattress such as below the main cell 120 constituting the mattress or above the main cell 120. However, the sub-cell 130 may have a configuration separate from the mattress.

Figure 11:
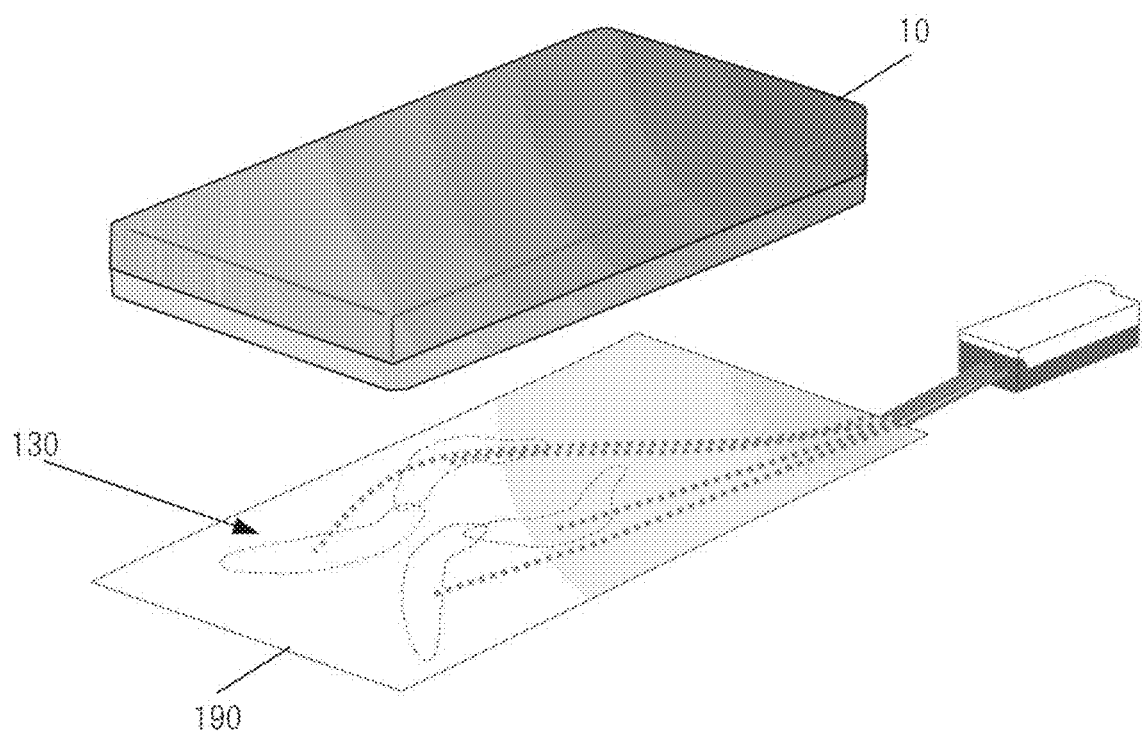
FIG. 11 is a view illustrating still another configuration of the mattress of this disclosure.

For example, in FIG. 11, the sub-cell 130 is of an underlay type in which it is disposed below the mattress 10. In this case, the mattress 10 may be an existing mattress, and thus the sub-cell 130 of the above embodiment can be disposed readily. Thereby, it is possible to add the body position changing function, provided by the sub-cell, to the existing mattress readily without preparing a dedicated mattress. Note that, the sub-cell 130 may be of an overlay type in which it is laid over the existing mattress.

Specifically, the sub-cell 130 may be constituted of one sheet. For example, a sub-cell sheet 190 of FIG. 11 has multiple spaces. By feeding the air from the pump 180 to these spaces, the spaces inflate to function as the sub-cell. In other words, since the spaces inflate or deflate when the air from the pump 180 is fed to or discharged from the spaces provided in the sheet, these spaces have the same function as the sub-cell.

In this manner, in the case of the sub-cell sheet 190 in which a sheet-shaped sub-cell is formed integrally, the same effect can be expected by merely installing the sub-cell sheet 190 below the mattress 10. Alternatively, the sub-cell sheet 190 may be installed above the mattress 10.

9.3 Configuration of Section

Meanwhile, although the above embodiment has been described such that the section of the bed body mainly has a configuration including the back section, the curved section, the upper leg section, and the lower leg section, the configuration of the section is not limited to the above configuration. For example, in general, the curved section may have the function of the back section and may have the function of the seat section. In addition, in the configuration of the section, the lower leg section may be configured integrally with the upper leg section. Further, by being divided into multiple parts, the back section may be configured to exhibit the same effect as the curved section (for example, an effect such that, among the back sections thus divided, the back section located on the foot side supports the waist of the user). The curved section may also be referred to as the seat section.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A mattress comprising:
an elastic bed cushion;
a sensor that is disposed at least above the elastic bed cushion and made of any of a conductive sheet and a conductive fiber, the sensor including:
a positive electrode; and
a ground electrode, wherein the elastic bed cushion is sandwiched between the positive electrode and the ground electrode;
a measurement unit that is configured to measure a change of capacitance of the sensor caused by deformation of the elastic bed cushion; and
a control unit that is configured to judge a position of a user on the mattress from the change of the capacitance measured by the measurement unit, wherein the control unit judges the position of the user on the mattress based on a weight information of the user in combination with the change of the capacitance;
wherein the elastic bed cushion includes a plurality of inflatable air cells which support the user's body, and the control unit presumes the weight information of the user from an air discharge time of the air cells.

2. The mattress according to claim 1, further comprising an electrode integrally formed in the bed cushion such that the positive electrode is immovable relative to the bed cushion.

3. The mattress according to claim 1, further comprising a positive electrode disposed facing the user wherein the electrode is configured to accumulate electric charges in the user and the sensor is configured to detect a change of the capacitance through the accumulation of electric charges.

4. The mattress according to claim 1, wherein the bed cushion includes a recess formed in the bed cushion for housing the positive electrode.

5. The mattress according to claim 1, wherein the control unit judges the position of the user on the mattress based on a weight of the user set via a user interface configured to output a manipulation signal to the control unit in combination with the change of the capacitance.

6. The mattress according to claim 1, wherein
the control unit judges the position of the user on the mattress based on a measured interior air pressure of the air cell and the change of the capacitance.

7. The mattress according to claim 1, wherein
the positive electrode includes two positive electrodes that are arranged on left and right sides of the elastic bed cushion, and
the control unit causes the measurement unit to judge the position of the user on the mattress based on the change of the capacitance for each of the positive electrodes.

8. The mattress according to claim 1, wherein the control unit presumes the weight information of the user from the inner pressure of the air cells.

9. The mattress according to claim 1, wherein the change in capacitance is a result of a change in distance between the positive electrode and the ground electrode when the elastic bed cushion is deformed.

10. The mattress according to claim 1, wherein the weight information of the user is set via a user interface screen.

11. A mattress comprising:
an elastic bed cushion;
a sensor that is disposed at least above the elastic bed cushion and made of any of a conductive sheet and a conductive fiber, the sensor including:
a positive electrode; and
a ground electrode, wherein the elastic bed cushion is sandwiched between the positive electrode and the ground electrode;
a measurement unit that is configured to measure a change of capacitance of the sensor caused by deformation of the elastic bed cushion; and
a control unit that is configured to judge a position of a user on the mattress from the change of the capacitance measured by the measurement unit, wherein the control unit judges the position of the user on the mattress based on a weight information of the user in combination with the change of the capacitance;
wherein the mattress further includes a data table storing reference data of the change of the capacitance at each user sleeping position recorded per user weight, and wherein the control unit judges the position of the user on the mattress based on weight information of the user combined with reference to the data table.

12. The mattress according to claim 11, further comprising an electrode integrally formed in the bed cushion such that the positive electrode is immovable relative to the bed cushion.

13. The mattress according to claim 11, further comprising a positive electrode disposed facing the user wherein the electrode is configured to accumulate electric charges in the user and the sensor is configured to detect a change of the capacitance through the accumulation of electric charges.

14. The mattress according to claim 11, wherein the bed cushion includes a recess formed in the bed cushion for housing the positive electrode.

15. The mattress according to claim 11, wherein the control unit judges the position of the user on the mattress based on a weight of the user set via a user interface configured to output a manipulation signal to the control unit in combination with the change of the capacitance.

16. The mattress according to claim 11, wherein the elastic bed cushion includes a plurality of inflatable air cells which support the user's body, and the control unit presumes the weight information of the user from the inner pressure of the air cells.

17. The mattress according to claim 11, wherein the weight information of the user is set via a user interface screen.

18. The mattress according to claim 11, wherein the change in capacitance is a result of a change in distance between the positive electrode and the ground electrode when the elastic bed cushion is deformed.

19. The mattress according to claim 11, wherein
the mattress further comprises an air cell, and
the control unit judges the position of the user on the mattress based on a measured interior air pressure of the air cell and the change of the capacitance.

20. The mattress according to claim 11, wherein
the positive electrode includes two positive electrodes that are arranged on left and right sides of the elastic bed cushion, and
the control unit causes the measurement unit to judge the position of the user on the mattress based on the change of the capacitance for each of the positive electrodes.

* * * * *